Figure 1:
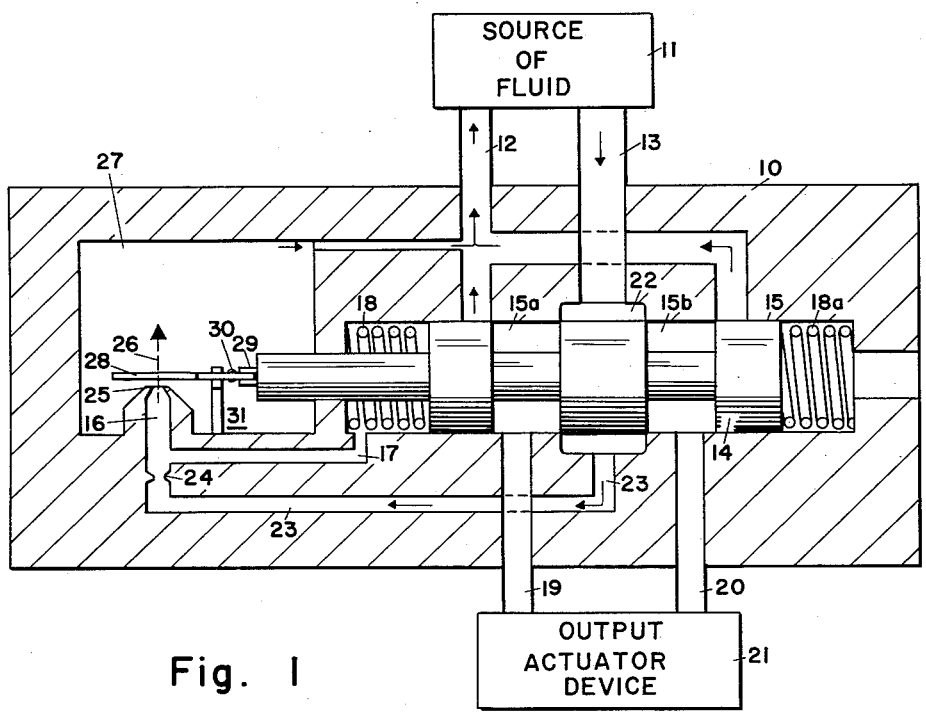

June 27, 1961 P. F. HAYNER 2,989,987
2-STAGE HYDRAULIC SERVO VALVE
Filed May 7, 1956 4 Sheets-Sheet 1

Paul F. Hayner
INVENTOR.

Paul F. Hayner
INVENTOR.

Paul F. Hayner
*INVENTOR.*

June 27, 1961  P. F. HAYNER  2,989,987
2-STAGE HYDRAULIC SERVO VALVE
Filed May 7, 1956  4 Sheets-Sheet 4

Paul F. Hayner
*INVENTOR.*

United States Patent Office 2,989,987
Patented June 27, 1961

2,989,987
2-STAGE HYDRAULIC SERVO VALVE
Paul F. Hayner, Nashua, N.H., assignor to Sanders Associates, Inc., Nashua, N.H., a corporation of Delaware
Filed May 7, 1956, Ser. No. 583,226
3 Claims. (Cl. 137—623)

This invention relates to hydraulic servo valves. More particularly, the invention relates to two-stage, electro-hydraulic servo valves in which pilot valve means control the pressure of fluid in a variable pressure chamber to actuate a control valve.

In the prior art, a number of hydraulic servo valves utilize a pilot member whose position is changed to vary the opening and, hence, the pressure of a variable pressure chamber to actuate a control valve. Such a valve is described in U.S. Patent #2,625,136 to W. C. Moog, Jr. These prior art valves are subject to certain well-known deficiencies which limit, for example, their linearity, sensitivity, hydraulic amplification, frequency response, stiffness and are subject to variations in operating characteristics due to changes in supply pressure. Variations in system pressure greater than five percent (5%) cause prior art valves to produce intolerable null shifts. Such valves are rendered quite unstable while the system pressure is initially building up. This sensitivity to system pressure variation is particularly undesirable in the highly sensitive valves typical of modern servo practice. In these valves, the effect of a relatively small shift in system pressure is large compared to the small total input power characteristic of such valves.

In valves of the class being considered, a pilot member is positioned in opposition to a jet stream of fluid flowing through a nozzle in a variable pressure chamber. They, thus, require work to position the pilot member since it operates through a distance against a definite pressure and force, and is, therefore, further subjected to reaction forces. It would be highly beneficial to substantially eliminate the effects of reaction forces operating against such a pilot valve member.

It is therefore an object of the invention to provide an improved hydraulic servo valve relatively insensitive to spurious pilot valve reaction forces.

It is another object of the invention to provide an improved hydraulic servo valve having increased sensitivity and higher hydraulic amplification.

A further object of the invention is to provide an improved hydraulic servo valve having an increased frequency response.

Yet another object of the invention is to provide an improved hydraulic servo valve having a high degree of linearity of control.

In accordance with the invention there is provided a hydraulic servo valve which comprises a valve body and a control valve, including a movable piston-valve, disposed in the body. The control valve is adapted selectively to control the passage of fluid under pressure therethrough. A variable pressure chamber is coupled to a piston-valve for controlling its motion by variations in pressure in the chamber. The chamber is adapted for connection to a source of fluid under pressure and has an orifice formed in a wall thereof to enable fluid flow therethrough along a predetermined jet stream axis. Pilot valve means are provided within the body and exterior the chamber. The pilot valve means have a member adjacent to and movable across the orifice. One of the orifices or a pilot valve member is affixed to the piston-valve. The pilot valve is thereby adapted to control the effective opening of the orifice by transverse motion relative to the direction of the jet stream whereby relatively small displacements of the pilot member relative the orifice cause the pressure in the chamber to vary and effect larger displacements of the piston-valve to control the flow of the fluid.

For a better understanding of the present invention, together with other and further objects thereof, reference is made to the following description taken in connection with the accompanying drawings, and its scope will be pointed out in the appended claims.

Figure 2:
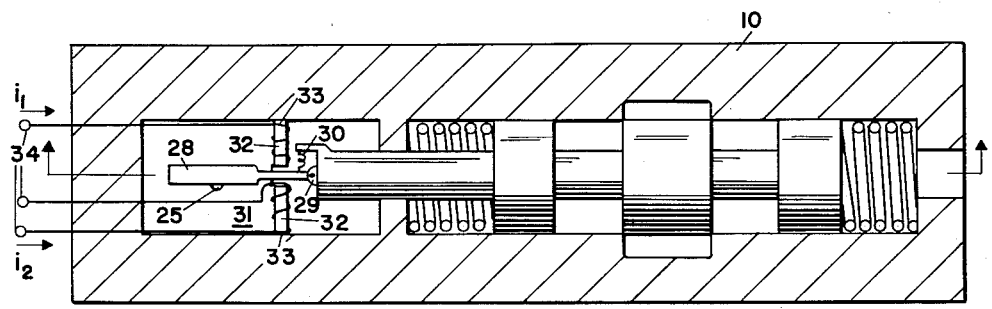
Figure 3:
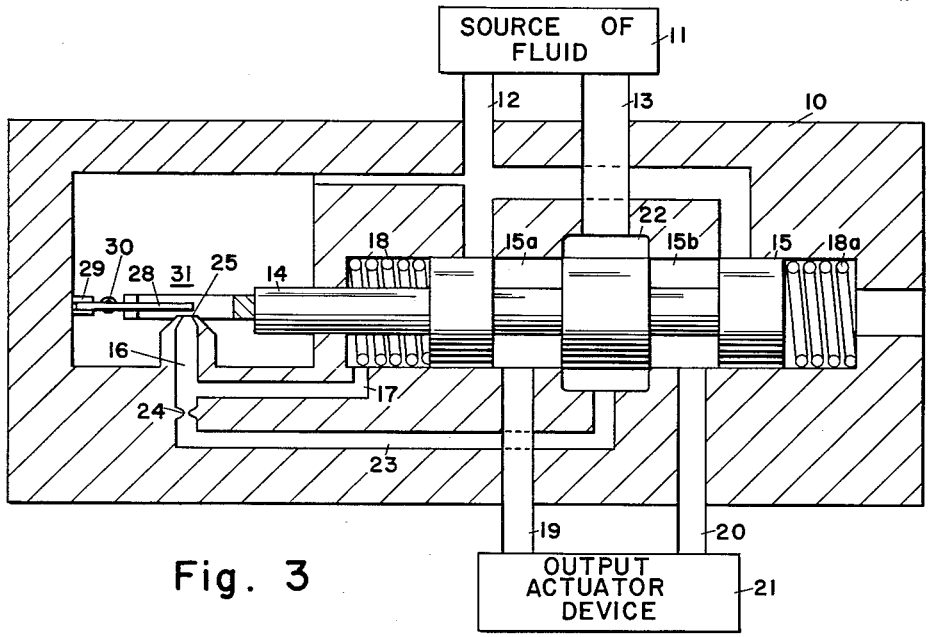
Figure 4:
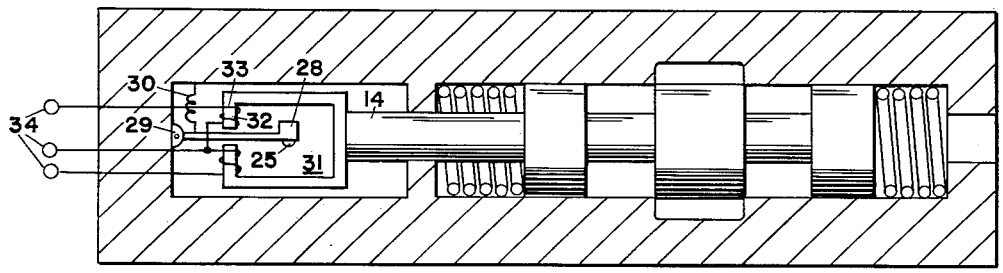
Figure 5:
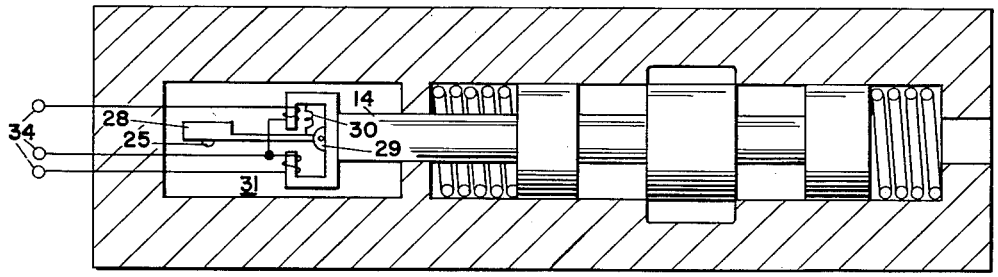
Figure 6:
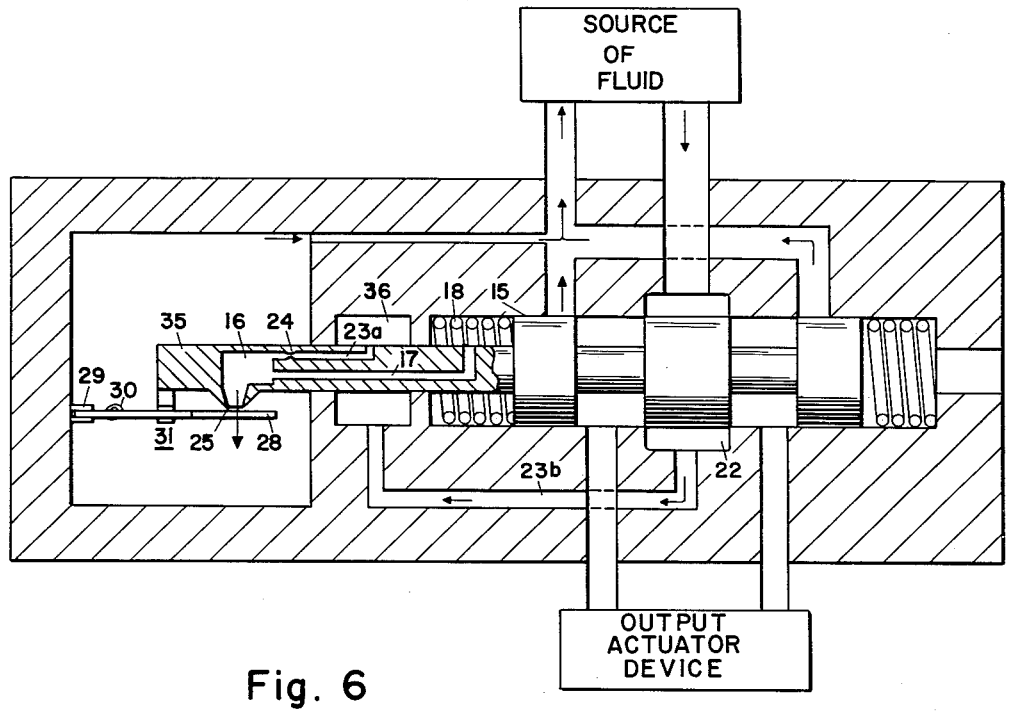
Figure 7:
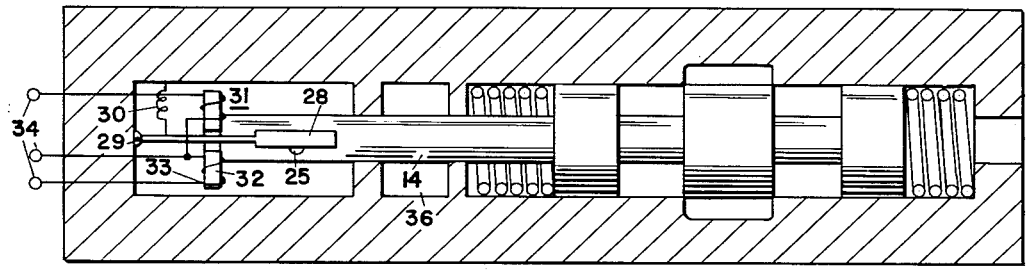
Figure 8:
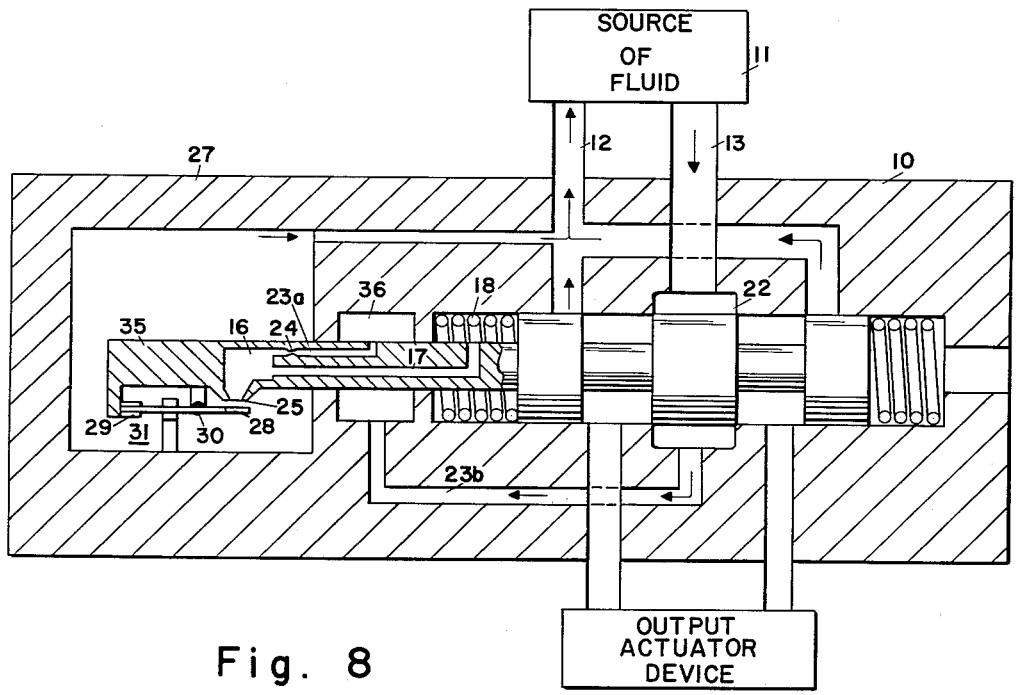
Figure 9:
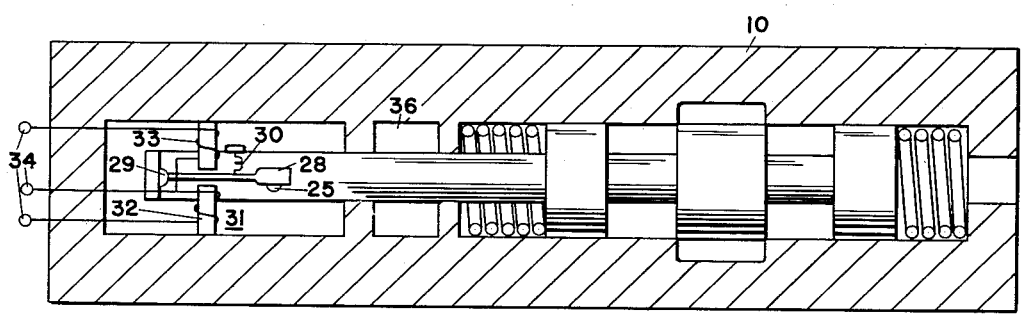

In the drawings:
FIG. 1 is a partially schematic, sectional, elevational view of an electro-hydraulic servo valve embodying the invention;
FIG. 2 is a partially schematic, sectional, plan view of the electro-hydraulic servo valve in FIG. 1;
FIG. 3 is a partially schematic, sectional, elevational view of a modification of the valve in FIG. 1;
FIG. 4 is a partially schematic, sectional, plan view of the valve in FIG. 3;
FIG. 5 is a partially schematic, sectional, plan view of another modification of the valve in FIG. 1;
FIG. 6 is a partially schematic, sectional, elevational view of a further modification of the valve in FIG. 1;
FIG. 7 is a partially schematic, sectional, plan view of the valve in FIG. 6;
FIG. 8 is a partially schematic, sectional, elevational view of a still further modification of the valve in FIG. 1; and
FIG. 9 is a partially schematic, sectional, plan view of the valve in FIG. 8.

DESCRIPTION AND OPERATION OF THE HYDRAULIC VALVE IN FIGS. 1 AND 2

Referring now in more detail to the drawings and with particular reference to FIGS. 1 and 2, there is here illustrated a hydraulic servo valve in neutral or no-signal condition. The servo valve includes a valve body 10, a control valve means, a variable pressure chamber coupled to the control valve, pilot valve means coupled to the variable pressure chamber and a motor member affixed to the valve body 10. The valve is adapted for a connection to a source 11 of fluid under pressure through the pressure conduit 13 and an exhaust conduit 12 which communicate with a control valve disposed in the valve body 10. The control valve includes a slidable control piston-valve 14 disposed in a control cylinder 15 formed in the valve body 10. The control valve couples fluid under pressure from the conduits 12 and 13 to a pair of output control passageways 19 and 20 which are in turn coupled to an output actuator device 21. In the preferred embodiment the control valve is a conventional four-way spool valve; hence, the piston-valve 14 is undercut to provide three lands, as shown, and, with the chamber 15, a pair of control chambers 15a and 15b adjacent the central land. The control chambers are continuously connected to the output control passageways 19 and 20. An annular chamber 22 surrounds the central land of the piston-valve 14 and communicates with a passageway 23 as further described below. In the neutral condition illustrated, the piston-valve 14 is centrally positioned by a pair of biasing springs 18 and 18a to occlude the conduits 12 and 13.

A variable pressure chamber 16 is hydraulically coupled to an end of the piston-valve 14 through a passageway 17. The chamber 16 is connected to the source 11 through a constriction 24, the passageway 23, the chamber 22 and the conduit 13. A nozzle or restricted orifice 25 is formed in an end of the chamber 16 to enable fluid flow therethrough along a predetermined jet stream axis 26. The chamber 16 is coupled from the orifice 25 through an adjacent pilot valve chamber 27 and a branch of the return conduit 12 to the source 11.

Pilot valve means are disposed within the valve body 10 exterior the chamber 16 and include a pilot member or cantilever 28 pivotally affixed to the piston-valve 14 by means of a pivot 29. The lever 28 is thus adapted to control the effective opening of the orifice by transverse motion relative to the axis 26 of the jet stream fluid emanating from the chamber 16. A pilot biasing spring 30, providing both expansion and compression bias, positions the lever 28 in its equilibrium, no-signal position. A solenoid 31 of an electromagnetic force motor is affixed to the valve body 10 and positions the lever 28 relative the orifice 25. The solenoid magnet is the motor stator and the lever 28 the motor rotor or armature. The stator comprises a pair of ferromagnetic cores 32 about which a pair of windings 33 are mounted. The windings are connected in series for connection, for example, to a push-pull source of input signals through a plurality of terminals 34. Since the lever 28 is also the armature for the motor, that part most directly adjacent the cores 32 is preferably formed of ferromagnetic material. That part of the lever 28 most directly adjacent the orifice 25 is preferably formed of non-magnetic material to preclude the adherence of magnetic metallic particles thereto.

*Operation*

Considering now the operation of the servo valve just described, still referring to FIGS. 1 and 2, the valve as illustrated is in equilibrium position. Opposing currents $i_1$ and $i_2$ in the windings 33 are then equal and opposite. Magentic flux thus produced provides magnetomotive forces operating on the lever 28 that are similarly equal and opposite. The differential current and hence, the differential magnetomotive force is likewise zero. At this time the lever 28 is so positioned as to half-way occlude the orifice 25.

Upon the application of a signal to the motor producing a differential current, the lever 28 is displaced from its central position relative the orifice 25 in opposition to the expansion or compression of the spring 30. The pressure in the chamber 16 increases or decreases to displace the piston-valve 14 accordingly to the right or left.

Thus, if the differential current is such as to cause the lever 28 to further occlude the orifice 25, the pressure in the chamber increases. The increased pressure is transmitted through the passageway 17 to an end of the piston-valve 14. The valve 14 is displaced to the right in response to the bias springs 18 and 18a to connect the conduit 13 through the control chamber 15a to the passageway 19; the branch conduit 12 is connected through the chamber 15b to the passageway 20. Conversely, when the signal is such that the differential current causes the lever 28 to be so positioned as to increase the effective opening of the orifice 25, the pressure in the chamber 16 decreases and the control piston-valve 14 moves to the left in response to the force provided by the biasing springs 18 and 18a. The differential pressure applied across the output actuator 21 is consequently reversed to produce a reversal of motion therein. Since no internal, inverse feedback is incorporated in the valve, as shown, the motion of the piston-valve 14 continues until it reaches an extreme position or the input signal is canceled electrically.

It is to be noted that the position of the lever 28 relative the orifice 25 is independent of the motion of the piston-valve 14. It will be apparent that a definite advance accrues thereby since only a small signal current is required to position the lever 28 relative the orifice 25. This advantage is realized because the motion of that part of the lever 28 which defines the effective opening of the orifice 25 moves in a direction orthogonal to that of the axis 26 of the jet stream of the fluid flow from the chamber 16. If the lever 28 were infinitely thin, no work would be done in controlling the opening of the orifice 25. Reaction forces introduced by virtue of the pressure change in the chamber 16 are normal to the direction of motion of the orifice opening-controlling end of the lever 28. These forces are directly transmitted through the lever 28 to the valve body 10 and produce a negligible effect on the operation of the positioning of the lever 28. By way of comparison, in the prior art, a pilot member analogous to the lever 28 is positioned directly in opposition to the pressure of the fluid in the chamber 16. The motion of such a prior art pilot member is axial relative to the axis of the jet stream as opposed to the orthogonal motion of the lever 28 in the present invention. Thus, where the position of the prior art pilot member is dependent upon both the fluid pressure in the chamber 16 and the reaction forces produced by variations in pressure, the operation of the pilot lever 28 in the present invention is independent of both.

DESCRIPTION OF THE VALVE IN FIGS. 3 AND 4

Referring now to FIGS. 3 and 4, a modification of the valve in FIG. 1 is here presented, in which the positions of the lever 28 and the solenoid 31 are reversed. Since the valve as shown in FIGS. 1 and 2 is otherwise similar to that of FIGS. 3 and 4, corresponding elements are indicated by identical reference numerals. Thus, the solenoid 31 as shown in FIGS. 3 and 4 is affixed to the piston-valve 14 and the lever 28 is affixed to the body of the valve as shown. The operation of the valve in FIGS. 3 and 4 is similar to that in FIGS. 1 and 2, differing only in that here the stator 31 is carried by the piston-valve 14.

DESCRIPTION OF THE VALVE IN FIG. 5

In the valve illustrated in FIG. 5 the lever 28 and the solenoid 31 are affixed together and to the piston-valve 14 as shown. Since the valve as shown is otherwise similar to that of FIGS. 1 and 2, corresponding elements are indicated by identical reference numerals. The operation of this valve is again similar to that of the valve in FIGS. 1 and 2, differing in that here both the stator 31 and lever 28 are carried by the piston-valve 14.

DESCRIPTION OF THE VALVE IN FIGS. 6 AND 7

Referring now to FIGS. 6 and 7, a modification of the valve in FIGS. 1 and 2 is here presented in which the lever 28 is affixed to the valve body and the solenoid 31 and variable pressure chamber 16 are carried by the piston-valve 14. Since the valve as shown in FIGS. 6 and 7 is otherwise similar to that in FIGS. 1 and 2, corresponding elements are indicated by identical reference numerals. Here, an extension 35 is affixed to the piston-valve 14 to which the solenoid 31 is mechanically connected as shown. The variable pressure chamber 16 is formed in the extension 35 with the nozzle pointed downward. The chamber is connected through the constriction 24 and passageway 23a to an intermediate chamber 36 formed in the valve body. The chamber 36 is hydraulically sealed from the bias spring 18. The variable pressure chamber 16 is connected through the passageway 17 now formed in the extension 35 which communicates directly with an end of the piston-valve 14. Fluid under pressure is coupled from the annular chamber 22 through a passageway 23b which now communicates with the intermediate chamber 36 and, thence, through the passageway 23a and the constriction 24 into the variable pressure chamber 16.

It will be apparent that the operation of the valve in FIGS. 6 and 7 is again similar to that of the valve in FIGS. 1 and 2, differing in that here the variable pressure chamber 16 and stator 31 are carried by the piston-valve 14.

DESCRIPTION OF THE VALVE IN FIGS. 8 AND 9

Referring now to FIGS. 8 and 9, a modification of the valve in FIGS. 1 and 2 is here presented as a further modification of the valve in FIGS. 6 and 7 in which the positions of the lever 28 and solenoid 31 are reversed. Thus, the solenoid 31 is affixed to the valve body while the lever 28 and chamber 16 are formed in the extension 35 of the piston-valve 14. Here again, the operation of the valve is otherwise similar to that of the valve in FIGS. 1 and 2, differing in that the chamber 16 and lever 28 travel with the piston-valve 14.

It will be apparent that the present invention provides an important step forward in the art of hydraulic control. The use of a pilot member in accordance with the principles of this invention to control the pressure of fluid in the variable pressure chamber by directing the pilot member transverse to the axis of a jet stream of fluid through an orifice in the chamber is indeed a unique and significant contribution. The principles of the invention, as disclosed herein, have broad application to a wide variety of hydraulic servo devices.

The present invention contributes substantially to reduction in complexity and expense of hydraulic servo valves. Thus, a valve as shown in FIG. 1 operates with a motor 0.2 ounce in weight as compared with 1.0 ounce for the smallest motors used in prior art valves. Similarly, this valve operates with an input power of only 0.001 watt as compared with the 0.1 watt for prior valves to produce the same output power. The size of the orifice 25 need be only 0.006 inch as compared with a diameter of 0.030 inch in the prior art for the same degree of pressure variation.

The frequency response of servo valves is limited by the mass of a movable pilot valve member. The mass of the lever 28 in the present invention need be only 0.001 gram as compared to 1 gram for such members in the prior art. In the instant valve, this decreased mass also contributes to greater sensitivity as well as greatly enhanced frequency response.

The freedom from noise, for example, due to spurious forces produced by turbulence of the fluid within the valve, is an advantage provided by valves embodying this invention that is unknown in the prior art.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A hydraulic servo valve, comprising: a valve body; a control valve including a movable piston-valve disposed in said body and adapted selectively to control the passage of fluid under pressure therethrough; a variable pressure chamber integrally formed with said body and hydraulically coupled to said piston-valve for controlling its motion by variations in pressure in the chamber and adapted for connection to a source of fluid under pressure, said chamber having an orifice formed in a wall thereof to enable fluid flow therethrough along a predetermined jet stream axis; and pilot valve means, including a motor stator affixed to and carried by said piston-valve, disposed within said body exterior said chamber and having a pilot lever affixed to said body adjacent to and movable across said orifice, said pilot valve means being adapted to control the effective opening of said orifice by transverse motion relative to the direction of said jet stream whereby relatively small displacements of said lever relative said orifice cause the pressure in said chamber to vary and effect larger displacements of said piston-valve to control the flow of said fluid.

2. A hydraulic servo valve, comprising: a valve body; a control valve including a movable piston-valve disposed in said body and adapted selectively to control the passage of fluid under pressure therethrough; a variable pressure chamber affixed to and carried by said piston-valve for controlling its motion by variations in pressure in the chamber and adapted for connection to a source of fluid under pressure, said chamber having an orifice formed in a wall thereof to enable fluid flow therethrough along a predetermined jet stream axis; and pilot valve means, including a motor stator affixed to and carried by said piston-valve, disposed within said body exterior said chamber and having a pilot lever affixed to said body adjacent to and movable across said orifice, said pilot valve means being adapted to control the effective opening of said orifice by transverse motion relative to the direction of said jet stream whereby relatively small displacements of said lever relative said orifice cause the pressure in said chamber to vary and effect larger displacements of said piston-valve to control the flow of said fluid.

3. A hydraulic servo valve, comprising: a valve body; a control valve including a movable piston-valve disposed in said body and adapted selectively to control the passage of fluid under pressure therethrough; a variable pressure chamber affixed to and carried by said piston-valve for controlling its motion by variations in pressure in the chamber and adapted for connection to a source of fluid under pressure, said chamber having an orifice formed in a wall thereof to enable fluid flow therethrough along a predetermined jet stream axis; and pilot valve means including a motor stator disposed within and affixed to said body exterior said chamber and having a pilot lever affixed to and carried by said piston-valve adjacent to and movable across said orifice, said pilot valve means being adapted to control the effective opening of said orifice by transverse motion relative to the direction of said jet stream whereby relatively small displacements of said lever relative said orifice cause the pressure in said chamber to vary and effect larger displacements of said piston-valve to control the flow of said fluid.

References Cited in the file of this patent

UNITED STATES PATENTS

| | | |
|---|---|---|
| 1,718,673 | Wettstein | June 25, 1929 |
| 2,599,159 | Breedlove | June 3, 1952 |
| 2,615,466 | Garde | Oct. 28, 1952 |
| 2,625,136 | Moog | Jan. 13, 1953 |
| 2,738,772 | Richter | July 21, 1954 |
| 2,767,689 | Mogg | Oct. 23, 1956 |
| 2,813,519 | Persson et al. | Nov. 19, 1957 |
| 2,838,028 | Erbguth | June 10, 1958 |
| 2,884,940 | Gorrie | May 5, 1959 |

FOREIGN PATENTS

| | | |
|---|---|---|
| 874,370 | France | May 4, 1942 |